No. 893,531. PATENTED JULY 14, 1908.
E. H. MARSHALL.
STOPPER.
APPLICATION FILED OCT. 29, 1907.
Fig. 1.
Fig. 4.
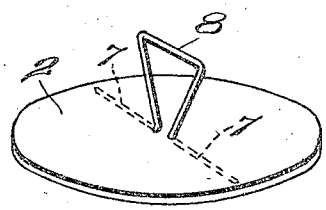
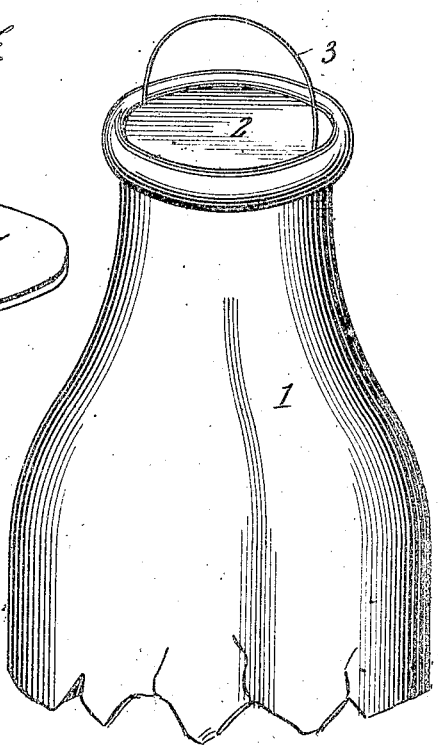
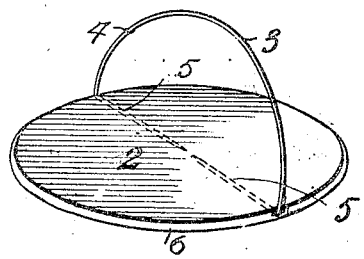
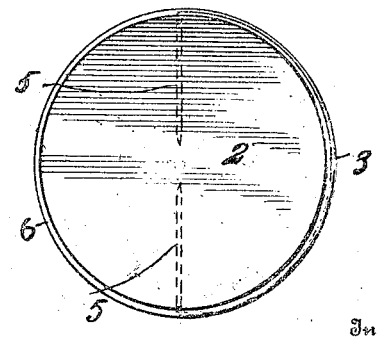
Fig. 2.
Fig. 3.
Witnesses
Hugh H. Otto
J. S. L. Wright
Inventor
Elizabeth H. Marshall
By Victor J. Evans
Attorney

UNITED STATES PATENT OFFICE.

ELIZABETH H. MARSHALL, OF FRONT ROYAL, VIRGINIA.

STOPPER.

No. 893,531.

Specification of Letters Patent.

Patented July 14, 1908.

Application filed October 29, 1907. Serial No. 399,772.

*To all whom it may concern:*

Be it known that I, ELIZABETH H. MARSHALL, a citizen of the United States, residing at Front Royal, in the county of Warren and State of Virginia, have invented new and useful Improvements in Stoppers, of which the following is a specification.

The invention relates to an improvement in stoppers for milk bottles, comprehending specifically a simple device arranged for connection with the ordinary disk stopper and serving to provide a convenient means for the initial removal of said stopper.

The main object of the present invention is the production of a bail member adapted for convenient connection with the sealing disk of a milk bottle or the like and serving to permit convenient removal of said disk, the construction and disposition of the bail permitting close storage of the disks when transported in bulk and also avoiding projection beyond the rim of the bottle.

The invention will be described in the following specification, reference being had particularly to the accompanying drawings, in which:—

Figure 1 is a perspective view of a portion of a bottle illustrating the application of my improvement thereto. Fig. 2 is a perspective view of the sealing disk removed, the improved bail being shown in operative position. Fig. 3 is a plan of the disk with the bail in inoperative position. Fig. 4 is a perspective view of a sealing disk having a slightly modified form of bail.

Referring particularly to the drawings, 1 represents a bottle formed in any usual or preferred manner for the reception of a sealing disk 2, both the bottle and disk being of the ordinary type now in use.

The present improvement is directed particularly to providing said disk with a removing means, which in the preferred form illustrated comprises a bail or handle 3, constructed of a single length of wire bent intermediate its ends to form a semi-circular portion 4 and projected at the ends of said portion to provide prongs 5 disposed in alinement and projecting toward each other, the terminals of the prongs being preferably sharpened and arranged in proximity, as illustrated. The circular or bail portion of the member is approximately curved to correspond with the curvature of the disk, and said member is engaged with the disk by passing the prongs 5 thereof through the material of the disk from the side edge, said prongs being respectively located at diametrically opposite points, as will be seen from Figs. 2 and 3.

Owing to the relative sizes of the bail and disk it is obvious that when not in position for use the bail member 4 may be turned down to rest immediately above and in contact with the peripheral edge of the disk, thereby avoiding obstruction above the mouth of the bottle. When desired for use the member is turned upwardly on the prongs 5 as pivotal points into a position approximately at right angles to the plane of the disk, in which position it serves as a handle or bail for the convenient removal of the disk.

The bail member is preferably constructed of very thin wire, and by the relative size and disposition thereof may be turned down onto the disk to avoid obstruction in packing or storing of the disks in transportation. Owing to the simple and inexpensive character of the improvement it is obvious that it will add practically but little additional cost to the disks now in use and that it may be readily discarded with the disk after use of the latter as at present.

As an addition to the present improvement I contemplate forming the peripheral edge of the disk at an incline to the surface plane of the disk, said incline preferably extending from the lower surface of the disk upwardly and inwardly, as more clearly shown in Fig. 3. By this construction there is provided between the peripheral edge alined with the upper surface of the disk and the walls of the bottle neck an open space, which is particularly adapted to receive the bail portion 4 of my improvement. It is, of course, understood that the peripheral edge of the disk alined with the lower surface thereof will engage the bottle wall and seal the bottle in the usual manner, while the decreased diameter of the upper surface of the disk spaces the edge of said portion a slight distance from the bottle wall to provide a receptive space for the bail member.

In Fig. 4 I have shown a slightly modified form of bail in which the wire length is bent to form prongs 7 which extend in opposite directions, the material of the bail beyond the prongs being projected into approximately V-form, as at 8. This form of bail is connected to the disk by inserting the prongs in the material of the disk at a point slightly beyond the center point of the disk, the prongs extending in opposite though diametrically alined relation. The projected or handle portion 8 of the bail is thus pivotally mounted on prongs in a manner to permit the bail to be conveniently turned down into contact with the surface of the disk or elevated for use as a handle.

Having thus described the invention what is claimed as new, is:—

1. The combination with a sealing disk for bottles, of a bail movably connected with the disk and adapted to be turned into operative or inoperative position with relation thereto, said bail corresponding in curvature throughout its projected length with the curvature of the disk.

2. A bail for bottle sealing disks comprising a single length of wire terminally formed to provide alined prongs, said prongs being adapted to be passed through the edge wall of the disk at diametrically opposite points, the material of the bail between the prongs being bent into semi-circular form.

3. A bail for bottle sealing disks comprising a single length of wire terminally formed to provide alined prongs, said prongs being adapted to be passed through the edge wall of the disk at diametrically opposite points, the material of the bail between the prongs being bent into semi-circular form, approximately equal in curvature to the curvature of the disk.

4. The combination with a sealing disk for bottles, of a bail movably connected with the disk and adapted to be turned into operative or inoperative position with relation thereto, said disk being peripherally cut away to provide a recess for the reception of the bail between the disk and bottle.

5. A sealing disk having its peripheral edge inclined, and a bail secured to the disk and corresponding in curvature and radius to the greatest diameter of the disk.

6. A sealing disk having its peripheral wall cut away to space a portion thereof from the bottle wall when the disk is in sealing position, in combination with a bail carried by the disk and adapted to seat in said space.

7. The combination with a sealing disk for bottles, of a bail constructed of a single length of wire terminally bent to provide alined prongs, the material of the bail between the prongs being projected to provide a hand gripping portion, the prongs of the bail seating throughout their lengths in the material of the disk to permit pivotal movement of the projected portion of the bail on the prongs.

In testimony whereof I affix my signature in presence of two witnesses.

ELIZABETH H. MARSHALL.

Witnesses:
 JAS. K. MARSHALL,
 LYDIA B. MARSHALL.